United States Patent Office 3,701,795
Patented Oct. 31, 1972

3,701,795
ALIPHATICALLY UNSATURATED AMIC ACID AND SILYLATED AMIC ACID
Fred F. Holub and Abe Berger, Schenectady, and Bruce B. Hardman and Michael P. Urkevich, Mechanicville, N.Y., assignors to General Electric Company
No Drawing. Filed Mar. 19, 1971, Ser. No. 126,291
Int. Cl. C07f 7/08
U.S. Cl. 260—448.2 N                 10 Claims

ABSTRACT OF THE DISCLOSURE

Organopolysiloxanes are provided wherein the organopolysiloxanes have either a terminal aliphatically unsaturated amic acid or aliphatically unsaturated silylated amic acid group attached at one end and an alkenyl group attached at the other end, said amic acid or silylated amic acid group being attached to silicon through carbon-silicon bonds. The novel compounds are used to form siloxanes useful as, for example, corrosion protective coatings for metal or ceramic surfaces.

---

This invention relates to novel aliphatically unsaturated organopolysiloxanes which have a terminal aliphatically unsaturated amic acid or aliphatically unsaturated silylated amic acid group attached at one end and an alkenyl group attached at the other end. Because of the presence of the alkenyl silane bond and the aliphatically unsaturated silylated amic acid group, it is possible to incorporate the latter composition into silicon hydride fluids, resins, elastomers, etc., via a platinum catalyzed hydrosilation reaction.

The unsaturated amic acid and silylated amic acid may be polymerized via the alkenyl silicon linkage to obtain polymers with unique properties. Thus, in addition to providing tough films exhibiting corona resistance, they show good adhesion to aluminum surfaces, excellent releasing properties and resistance to deformation at high temperatures. In the cured state, the compositions herein described and claimed can be used as high temperature insulation for electrical conductors and corrosion protective coatings for metal or ceramic surfaces.

In accordance with the present invention, we have discovered a class of novel unsaturated organopolysiloxanes having the formula:

1.
$$Z-R'-\left[\begin{array}{c}R\\|\\-Si-O\\|\\R\end{array}\right]_n\begin{array}{c}R\\|\\-Si-Y\\|\\R\end{array}$$

wherein
R is a monovalent hydrocarbon radical, or a cyanoalkyl radical;
R' is a divalent alkylene radical having 1–6 carbon atoms (including methylene, ethylene, propylene, butylene, and pentylene).
Y is vinyl, allyl, methallyl or styryl (ortho, meta, or para);
Z is aliphatically unsaturated amic acid or an aliphatically unsaturated silylated amic acid group; and
n is an integer equal to at least 1, e.g., from 1 to 1,000 or more. The terminally functional groups Y and Z are attached directly to silicon atoms by carbon-silicon bonds. Thus, while the Y group is alkenyl in character, the Z group may be subdivided into Subclass A having an aliphatically unsaturated amic acid group and Subclass B having an aliphatically unsaturated silylated amic acid group.

Radicals included by R of the above formula are for example, aryl radicals such as phenyl, tolyl, naphthyl, etc.; aralkyl radicals such as phenylethyl, etc.; aliphatic and cycloaliphatic, such as cyclohexyl, cyclobutyl, etc.; alkyl, alkenyl, and alkynyl such as methyl, ethyl, propyl, vinyl, allyl, etc.; and cyanoalkyl radicals such as cyanoethyl, cyanopropyl, cyanobutyl, etc. R in the above formulae can be the same radical or any two or more of the aforementioned R radicals.

In the copending application of Holub et al., organopolysiloxanes having amino functional groups have been described as set forth by the formula:

2.
$$NH_2-R'-\left[\begin{array}{c}R\\|\\-Si-O\\|\\R\end{array}\right]_n\begin{array}{c}R\\|\\-Si-Y\\|\\R\end{array}$$

wherein R, R', Y, and n are defined hereinabove. These compounds may be prepared by a base catalyzed equilibration reaction as illustrated by the specific reaction, $$\left(NH_2-R'-\underset{\underset{R}{|}}{\overset{\overset{R}{|}}{Si}}\right)_2-O + \left(CH_2=CH-\underset{\underset{R}{|}}{\overset{\overset{R}{|}}{Si}}\right)_2-O \xrightarrow{KOH}$$

$$2NH_2-R'-\underset{\underset{R}{|}}{\overset{\overset{R}{|}}{Si}}-O-\underset{\underset{R}{|}}{\overset{\overset{R}{|}}{Si}}-CH=CH_2$$

wherein R and R' are defined hereinabove. This reaction occurs at temperatures about 25–200° C., and preferably between 80–120° C.

The compounds of Subclass A having an aliphatically unsaturated amic acid group may be expressed by the formula:

3.
$$\underset{\underset{\underset{OH}{\overset{\|}{C}}}{\overset{\overset{O}{\|}}{\underset{|}{C}}}}{\overset{R''}{\underset{H}{\diagup}}}\overset{H}{\underset{}{N}}-R'-\left[\begin{array}{c}R\\|\\-Si-O\\|\\R\end{array}\right]_n\begin{array}{c}R\\|\\-Si-Y\\|\\R\end{array}$$

wherein R, R', Y, and n are defined hereinabove. The symbol R" is a divalent aliphatically unsaturated radical selected from the group consisting of radicals having the structure:

(a)  HC—
     ‖
     HC—

(b)  H₂C=C—
         |
         H₂C—

(c)  CH₃—C—
         ‖
         HC—

(d)      CH₂
       /    \
     HC      HC—
     ‖       |
     HC      HC—
       \    /
         CH₂

(e)      CH₂
       /  |  \
     HC   |   HC—
     ‖    CH₂  |
     HC   |   HC—
       \  |  /
         CH₂ and (f)   (H)₃ C
         ╲  ╱ ╲ H
         C      C—
         ‖  CH₂  |
         C      C—
         ╱  ╲ ╱ ╲ H
        CH₃  C These aliphatically unsaturated amic acid compounds may be prepared by an addition reaction between an aliphatically unsaturated anhydride (e.g. maleic anhydride, tetrahydrophthalic anhydride, and endomethylenetetrahydrophthalic anhydride), and the aminoorganosiloxane as illustrated, for example, by the equation:

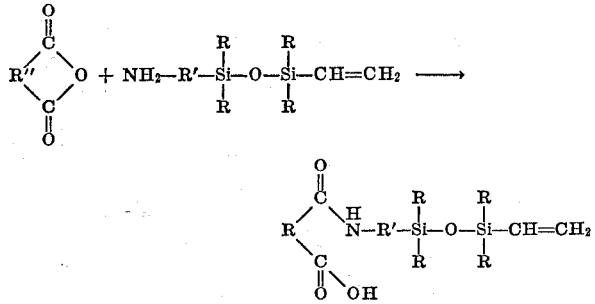

wherein R, R', and R'' are defined hereinabove. The addition reaction is usually carried out at room temperature in solvents such as dimethylformamide or diethyl ether and the like. The reaction tends to be exothermic and usually temperatures of about 25-60° C. are preferred. Upon continued heating at higher temperatures, water is eliminated and the corresponding imides are formed.

The silylated amic acids of Subclass B are prepared by treating the aliphatically unsaturated acids of Subclass A with a variety of conventional silylating agents, such as trialkylhalosilanes, hexaalkyldisilazanes, dialkylaminotrialkylsilanes, alkylenoxysilanes, mono- or bis-trialkylsilylamides, etc. Selective silylation at the carboxy group and not at the amido-hydrogen bond may be obtained by using enoxyalkylsilanes, such as isopropenoxytrimethylsilanes. The silylation reaction may be illustrated, for example, by the equation:

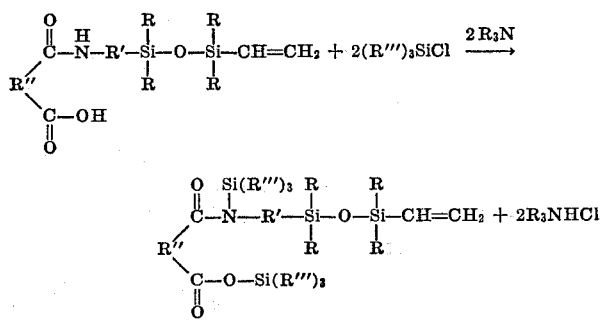

wherein R, R', and R'' are defined hereinabove and R''' is lower alkyl containing from 1 to 6 carbon atoms.

The organopolysiloxanes of Subclass A or Subclass B of the present invention can be blended with aliphatically unsaturated organic material, such as aliphatically unsaturated organic monomers. Blends of the organopolysiloxanes and aliphatically unsaturated organic material can be made over wide proportions by weight. Experience has shown that there should be employed at least about 15%, by weight, of the organopolysiloxanes to provide for cured products exhibiting such valuable characteristics as corona resistance, solvent resistance, flexibility, etc. Depending upon the proportion of the organopolysiloxane and the aliphatically unsaturated monomer or polymer, the curable blends can provide for laminates, solventless varnishes, molding compounds, coating compositions, etc. Included by the aliphatically unsaturated monomers that can be employed in combination with the organopolysiloxanes are, for example, styrene, diallylphthalate, vinyl esters of organic carboxylic acid, such as vinyl formate, vinyl acetate; acrylic esters, such as methyl-, ethyl-, butyl-, etc.; esters of acrylic and methacrylic acids, etc.; and others such as acrylonitrile, divinylbenzene, triallyl citrate, triallyl cyanurate, N-vinyl phthalimide, N-allyl phthalimide, N-allyl tetrachlorophthalimide, bis(endomethylenetetrahydrophthalimide) of methylenedianiline, bismaleimide of methylenedianiline and mixtures with methylene dianiline and the bismaleimide of methylenedianiline, etc. Among the organic polymers that can be employed in combination with the organopolysiloxanes of the present invention are, for example, polyurethanes, unsaturated polyesters and polysiloxanes, etc.

In addition to the aforementioned aliphatically unsaturated monomers and organic polymers which can be employed with the polysiloxanes, there also can be employed in proportions of 0 to 200 parts of fillers, per 100 parts of the organopolysiloxane, such as treated clay, ground quartz, fumed silica, sand, carbon black, glass fibers, glass beads, carbon fiber, boron fiber, quartz fiber, etc. In addition, other ingredients can be utilized in an amount of from 60% to 90% by weight of the total composition such as solvents including N-methylpyrrolidone, dimethylacetamide, methylethylketone and plasticizers such as trioctyl trimellitate, diisodecylphthalate, etc.

Our invention is further illustrated by the following examples. Unless otherwise indicated, all parts are by weight.

EXAMPLE I

Preparation of 1-(δ-aminobutyl)-3-vinyltetramethyldisiloxane

A mixture of 0.2 mole (55.2 grams) 1,3-bis(δ-aminobutyl)tetramethyldisiloxane and 0.2 mole (37.2 grams) 1,3-bis(vinyl)tetramethyldisiloxane was heated at 90° C. for 2-3 hours in the presence of 1.0 gram of potassium hydroxide. The basic catalyst was neutralized with an equivalent amount of a dilute hydrochloric acid solution, followed by two aqueous washings. Upon distillation under vacuum, a 60% yield of 1-(δ-aminobutyl)-3-vinyltetramethyldisiloxane (B.P. 84° C./0.85 mm. Hg) was obtained. An infrared spectrum of this material showed absorption (microns) for vinyl (3.2, 6.2, 7.1, 9.9, 10.4), primary amine (2.9, 3.0), and a broad band at 6.1-6.3.

EXAMPLE II

Preparation of N-(vinyldimethylsiloxydimethylsilylbutyl(tetrahydrophthalamic acid A reaction mixture of 0.273 mole (63 grams) 1-(δ-aminobutyl)-3-vinyltetramethyldisiloxane as prepared in Example I above and 0.273 mole (41 grams) tetrahydrophthalic anhydride was combined in 100 cc. anhydrous dimethylformamide and allowed to stir at ambient temperatures for two days. The reaction mixture was poured into water and the organic phase was separated. The organic phase was extracted with chloroform and the chloroform layer was dried with MgSO$_4$ and filtered. The dried extract was devolatilized under reduced pressure to yield the desired tetrahydrophthalamic acid.

EXAMPLE III

Preparation of N-(vinyldimethylsiloxydimethylsilylbutyl)maleamic acid

Following the procedure of Example II, 0.273 mole (26.8 grams) maleic anhydride was combined with 0.273 mole (63 grams) 1-(δ-aminobutyl)-3-vinyltetramethyldisiloxane in 100 ml. of dimethylformamide. The reaction was exothermic. It was allowed to stir at room temperature for 6 hours and poured into 500 ml. ice water. The bottom layer (organic) was separated, dried with anhydrous magnesium sulfate and filtered. The dried extract was then devolatilized under reduced pressure to yield the desired maleamic acid derivative.

EXAMPLE IV

Preparation of N - (vinyldimethylsiloxydimethylsilylbutyl)-δ-3,6-endomethylene-$\Delta^4$ - tetrahydrophthalamic acid Following the procedure of Example II, a reaction mixture of molar equivalent quantities of (δ-aminobutyl)-3-vinyltetramethyldisiloxane and 3,6-endomethylene-$\Delta^4$- tetrahydrophthalic anhydride were combined in the presence of N,N-dimethylacetamide. An exothermic reaction was noted. The mixture was stirred for 2 hours at room temperature. The reaction mixture was poured onto ice water and the organic layer extracted two times with diethyl ether. The ether layer was washed with 10% aqueous sodium carbonate solution until the washings were slightly basic, dried and stripped, leaving N-(vinyldimethylsiloxydimethylsilylbutyl)-δ-3,6 - endomethylene-Δ⁴-tetrahydrophthalamic acid.

EXAMPLE V

To an etheral solution of N-(vinyldimethylsiloxydimethylsilylbutyl)maleamic acid was added two molar equivalents of triethylamine. With rapid stirring, there was added slowly two molar equivalents of trimethylchlorosilane. An exothermic reaction occurred. As the reaction proceeded, a white precipitate of triethylamine hydrochloride formed. Stirring became more difficult and additional quantities of ether were added to facilitate stirring. Upon complete chlorosilane addition, the reaction mixture was refluxed using an external heat source for 3 hours, cooled, filtered and stripped of solvent. A mobile oil remained behind. An IR scan showed complete absence of carboxy-OH absorption as well as —N—H (amide) absorption. The appearance of CH₃Si≡ absorption was thus indicative of proton replacement by trimethylsilyl groups.

The analysis indicated the structure of the compound as shown below:

$$CH_2{=}CH{-}\underset{\underset{CH_3}{|}}{\overset{\overset{CH_3}{|}}{Si}}{-}O{-}\underset{\underset{CH_3}{|}}{\overset{\overset{CH_3}{|}}{Si}}{-}CH_2{-}CH_2{-}CH_2{-}CH_2{-}\underset{\underset{(CH_3)_3SiO{-}\overset{\overset{O}{\|}}{C}}{}}{N}{-}\overset{\overset{(CH_3)_3Si\;O}{\underset{|}{\;}\underset{\|}{\;}}}{C}\diagdown_{\underset{CH}{\overset{CH}{\|}}}$$

EXAMPLE VI

A mixture consisting of 20 parts N-(vinyldimethylsiloxydimethylsilylbutyl)-maleamic acid, 80 parts dimethylformamide and 0.4 part dicumylperoxide was cast on a sheet of aluminum and heated 1 hour at 130° and then an additional hour at 200° C. A tough flexible film resulted which possessed excellent release characteristics. Adhesive tape would not bond to this film. It showed excellent adhesion to aluminum and had a cut-through of ca. 400° C.

EXAMPLE VII

Using the siloxane maleamic acid of Example II, a paint composition was prepared.

Paint composition:                Parts by weight
    Siloxane maleamic acid _____ 100
    Titanium dioxane (rutile) _____ 100

The above mixture was milled on a sand mill using glass beads instead of sand as the grinding medium for 5 minutes at 8000 r.p.m. and strained free of the beads.

One to two percent benzoyl peroxide( on vehicle solids) was added to the pigmented vehicle and a 2 mil (.002″) film was laid down on both a phosphate treated aluminum panel and a glass panel. These were baked at 125–150° C. for 1 hour and gave a paint film of good integrity and very good adhesion to both the metal and glass. This amic acid may be incorporated into various unsaturated esters, epoxies and coil-coating compositions to yield paints with improved properties.

It will be appreciated that the invention is not limited to the specific details shown in the examples and illustrations and that various modifications may be made within the ordinary skill in the art without departing from the spirit and scope of the invention.

We claim:

1. An aliphatically unsaturated organopolysiloxane of the formula:

$$Z{-}R'{-}\left[\underset{\underset{R}{|}}{\overset{\overset{R}{|}}{Si}}{-}O\right]_n{-}\underset{\underset{R}{|}}{\overset{\overset{R}{|}}{Si}}{-}Y$$

wherein

R is a member selected from the group consisting of methyl, ethyl, cyclohexyl, phenyl and mixtures thereof;

R' is a divalent alkylene radical having 1–6 carbon atoms;

Y is a member selected from the group consisting of vinyl, allyl, methallyl, and styryl;

Z is a member selected from the group consisting of aliphatically unsaturated amic acid and aliphatically unsaturated silylated amic acid; and n is an integer of at least 1.

2. The organopolysiloxane of claim 1, wherein Z is an aliphatically unsaturated amic acid having the formula:

$$R''\diagdown_{\overset{\overset{O}{\|}}{C}{-}\underset{\underset{}{}}{N}{-}}^{\;H}\diagup_{\overset{\overset{}{}}{C}{-}OH}^{\;}$$

wherein R'' is a divalent aliphatically unsaturated radical selected from the group consisting of radicals having the formula:

(a) HC—
    ‖
    HC—

(b) CH₂=C—
    |
    H₂C—

(c) CH₃—C—
    ‖
    HC—

(d) 
    CH₂
   / \
 HC   HC—
 ‖    |
 HC   HC—
   \ /
    CH₂

(e) 
    CH₂
   / \
 HC   HC—
 ‖    |CH₂|
 HC   HC—
   \ /
    CH₂ and (f) 
$$\underset{CH_3}{\overset{(H)_3\;C}{\underset{}{\;}}}\diagup^{}\diagdown_{}\underset{\overset{}{}}{\;}$$

3. The organopolysiloxane of claim 2, wherein the compound is N-(vinyldimethylsiloxydimethylsilylbutyl) tetrahydrophthalamic acid.

4. The organopolysiloxane of claim 2, wherein the compound is N-(vinyldimethylsiloxydimethylsilylbutyl) maleamic acid.

5. The organopolysiloxane of claim 2, wherein the compound is N-(vinyldimethylsiloxydimethylsilylbutyl)-δ-3,6-endomethylene-Δ⁴-tetrahydrophthalamic acid.

6. The organopolysiloxane of claim 1, wherein Z is aliphatically unsaturated silylated amic acid having the formula:

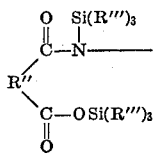

wherein R'' is a divalent aliphatically unsaturated radical selected from the group consisting of radicals having the formula:

(a) HC—
     ‖
     HC—

(b) CH₂=C—
     |
     H₂C—

(c) CH₃—C—
     ‖
     HC—

(d) 
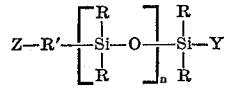

(e) 
     CH₂
    /  \
  HC    HC—
   ‖    |
        CH₂
        |
  HC    HC—
    \  /
     CH₂ and (f) 
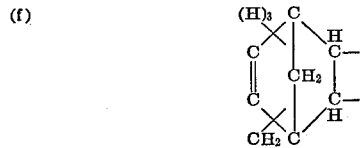

and R''' is lower alkyl having from 1–6 carbon atoms.

7. The organopolysiloxane of claim 6, wherein the compound is N-(vinyldimethylsiloxydimethylsilylbutyl)-N-(trimethylsilyl)-trimethylsilylmaleamic acid ester.

8. A method of making an aliphatically unsaturated organopolysiloxane of the formula:

$$Z-R'-\left[\begin{array}{c}R\\|\\Si-O\\|\\R\end{array}\right]_n\begin{array}{c}R\\|\\Si-Y\\|\\R\end{array}$$

wherein

R is a member selected from the group consisting of methyl, ethyl, cyclohexyl, phenyl and mixtures thereof;

R' is an alkenyl radical having 1–11 carbon atoms;

Y is a member selected from the group consisting of vinyl, allyl, ethyl cyclohexenyl;

Z is aliphatically unsaturated amic acid; and n is an integer having a value of 1, comprising reacting a compound of the formula:

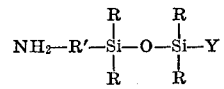

wherein R, R' and Y are defined hereinabove, with an aliphatically unsaturated anhydride of the formula:

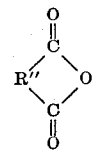

wherein R'' is a divalent aliphatically unsaturated radical as defined in claim 6 hereinabove, at a temperature of about 25–60° C. for a time sufficient to obtain said aliphatically unsaturated organopolysiloxane.

9. The method of claim 8, wherein the aliphatically unsaturated amic acid is subsequently reacted with a silylating agent in the presence of a molar excess of a tertiary amine.

10. The method of claim 9, wherein said silylating agent is a member selected from the group consisting of trialkylhalosilanes, hexalkyldisilazanes, dialkylaminotrialkylsilanes, alkylenoxysilanes, mono- or bis-trialkylsilylamides.

References Cited

UNITED STATES PATENTS 3,558,741   1/1971   Holub et al.   260—448.2 N X
3,576,031   4/1971   Holub et al.   260—448.2 N
3,646,084   2/1972   Evans et al.   260—448.2 E JAMES E. POER, Primary Examiner P. F. SHAVER, Assistant Examiner U.S. Cl. X.R.

106—14; 117—124 F, 132 B S, 135.1; 260—32.4, 37 S B, 46.5 E, 448.2 H, 448.2 Q, 448.2 E